United States Patent [19]

Ross

[11] 4,303,406
[45] Dec. 1, 1981

[54] AUTOMATIC LIQUID LEVEL CONTROL

[75] Inventor: Frank E. Ross, Newton, Iowa

[73] Assignee: The Maytag Company, Newton, Iowa

[21] Appl. No.: 130,470

[22] Filed: Mar. 14, 1980

[51] Int. Cl.³ ...................... D06F 33/02; D06F 39/08
[52] U.S. Cl. ...................................... 8/158; 68/12 R; 68/207
[58] Field of Search ............... 68/12 R, 207; 137/387; 8/158

[56] References Cited

U.S. PATENT DOCUMENTS

| | | | |
|---|---|---|---|
| 3,030,790 | 4/1962 | Davenport et al. | 68/12 R |
| 3,065,618 | 11/1962 | Cobb et al. | 68/12 R |
| 3,086,836 | 4/1963 | Ohmann | 8/158 |
| 3,093,841 | 6/1963 | Cobb et al. | 8/158 |
| 3,478,373 | 11/1969 | McBride et al. | 8/158 |

FOREIGN PATENT DOCUMENTS 54-105861  8/1979  Japan ..................................... 68/207
54-113970  9/1979  Japan ..................................... 68/207

Primary Examiner—Philip R. Coe
Attorney, Agent, or Firm—Richard L. Ward

[57] ABSTRACT

An automatic liquid level control system is provided for a laundry appliance having a tub and a perforate fabric basket within the tub. Washing liquid is injected onto the surface of fabrics to be laundered. A portion of the washing liquid will be absorbed by the fabrics and a portion will flow through the fabrics and fabric basket perforations for accumulation in the tub. Sensing devices are provided for monitoring the changing liquid level in the tub and the time required to reach predetermined levels. A programmable controller determines the quantity of additional liquid required to launder the fabric load responsive to the sensing devices and commensurate with the load characteristics and controls the injection thereof onto the fabrics.

11 Claims, 6 Drawing Figures

AUTOMATIC LIQUID LEVEL CONTROL

BACKGROUND OF THE INVENTION

This invention relates generally to the field of automatic washing machines and more particularly to a control for determining and supplying the minimum quantity of liquid for properly washing specific fabric loads.

One prior art automatic liquid level control uses a spray device to introduce a predetermined amount of washing liquid into a spinning load of fabrics. A collector rib is formed in the tub for collecting a portion of the liquid introduced into the spinning load as a measure of the liquid absorbed by the load. A liquid collection area is built into the tub at either the bottom or outside of the tub and a pressure-sensitive device is attached to the liquid collection area in communication with the collector rib. The contacts of a liquid level switch are preset, or effectively biased, in proportion to the collected liquid according to the requirements of a given load of fabrics.

Several other prior art liquid level control systems are based on sensing agitation torque to indicate the proper liquid level. In one patent disclosure, if the initial minimum liquid level will prevent the agitation torque from exceeding a minimum the machine will wash at that level. Generally, however, with the minimum liquid level the agitator will transmit torque through the load to the basket and tank or tub to close a switch contact which will energize the liquid inlet solenoid through a relay system.

Still another system senses the number of fabric rollovers per unit of time. When the proper flow and rollover pattern is established for the washing liquid, the sensing means operates to terminate introduction of liquid.

SUMMARY OF THE INVENTION

It is an object of the instant invention to provide an improved automatic liquid level control for a laundry appliance.

It is a further object of the instant invention to determine and supply the minimum quantity of liquid for properly treating specific fabric loads.

It is a still further object of the instant invention to provide a microcomputer based system operable for determining, from sensed conditions, the proper minimum liquid level for treating a specific fabric load and for initiating operation of liquid inlet apparatus to provide this level.

Briefly, the instant invention achieves these objects in an automatic liquid level control system for a laundry apparatus having a tub for containing liquid and a perforate basket within the tub for containing fabrics to be treated. An inlet system is provided for supplying liquid to the tub by spraying liquid onto the fabrics for absorption by the fabrics and flow through the fabrics for accumulation in the tub. Apparatus is also provided for measuring the rate of change of liquid level in the tub in the presence of the fabrics as a gauge of the total liquid required to treat the specific fabric load in the basket. A programmable controller is responsive to the measuring apparatus for determining the additional liquid required to provide the total liquid for controlling the inlet system to provide an additional timed fill to achieve the total liquid.

Operation of the apparatus and further objects and advantages thereof will become evident as the description proceeds and from an examination of the following three pages of drawings.

BRIEF DESCRIPTION OF THE DRAWINGS

The drawings illustrate a preferred embodiment of the invention with similar numerals referring to similar parts throughout the several views, wherein.

DESCRIPTION OF A PREFERRED EMBODIMENT

Figure 1:
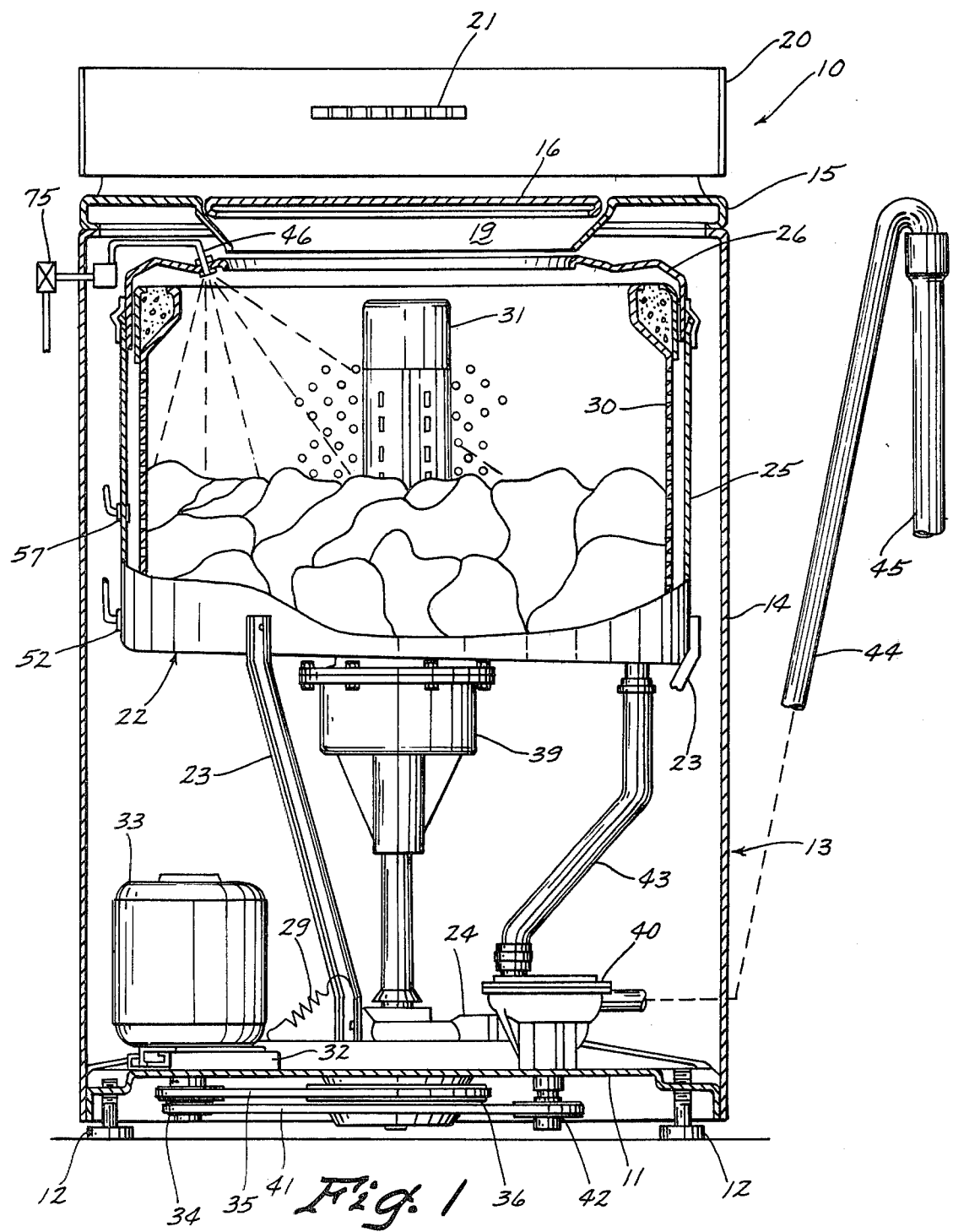
FIG. 1 is an overall view of an automatic washing machine partially sectioned to more clearly show elements of the instant invention.

Referring now to FIG. 1 there is shown an automatic fabric washing machine 10 including a base frame 11 supported on a plurality of adjustable legs 12 and mounting a cabinet 13 comprising a side wall portion 14 and a top cover portion 15. The top cover portion 15 includes a hinged door panel 16 normally covering a recessed loading opening 19 and further includes an upwardly extending housing 20 for accommodating various control members 21.

Mounted within the cabinet 13 is a tub assembly 22 nutationally supported on the base frame 11 by an inverted tripod arrangement including tub braces 23 which are connected at the lower end to a support member 24 positioned on the base frame 11. The tub braces 23 are connected at their upper ends to a generally imperforate liquid container or outer tub 25 including a tub cover 26. The tub braces 23 are also resiliently connected to the base frame 11 by means of centering springs 29 which resist rotation of the support member 29 relative to the base frame 11 but permit nutational movement of the tub assembly 22 relative to the base frame 11.

Revolvably mounted in the imperforate outer tub 25 is a perforate fabric basket or inner tub 30 in which is positioned an oscillatable agitator 31 for effecting movement of fabrics and washing liquid within the tub assembly 22. The imperforate outer tub 25 and the perforate inner tub 30 are substantially aligned with the loading opening 19 in the top cover 15 for permitting the operator to place fabrics within the inner tub 30 and to remove them upon completion of the cycle.

The base frame 11 also supports, through a movable motor mount 32, a reversible drive motor 33 operable in a bidirectional drive system for selectively effecting oscillation of the agitator 31 or centrifugal rotation of the inner tub 30. The drive system for selectively effecting operation of the agitator 31 and rotation of the inner tub 30 includes a double groove pulley 34 fixed to the shaft of the motor 33 and drivingly engaged with a main drive belt 35 which in turn is drivingly engaged with the main drive pulley 36. The main drive pulley 36 is drivingly connected to either the agitator 31 through a drive shaft (not shown) and the gearing of a transmission 39 or to the inner tub 30 through the housing of the transmission 39 and a clutch (not shown).

Operation of the motor 33 in a first direction effects rotation of the main drive pulley 36 for effecting oscillation of the agitator 31 through the drive shaft (not shown) and transmission 39 gearing. Operation of the motor 33 in the opposite direction effects rotation of the drive pulley 36 and the transmission 39 through the clutch (not shown) for rotating the inner tub 30 to effect centrifugal extraction of liquid from fabrics within the inner tub 30.

The washing machine 10 is provided with controls 21 for programming the machine 10 through a sequence of operations including energization of the motor 33 for operation in a first direction to effect a washing and/or rinsing function followed, at a later point in a normal cycle of operations, by energization of the motor 33 in a second direction to effect a liquid extraction and liquid pumping function.

The construction and mounting of the tub assembly 22 and the operation of the inner tub 30 and agitator 31 are more clearly and specifically shown in the following patents, each of which is assigned to the assignee of the instant invention: Scott et al, U.S. Pat. No. 2,854,297; Smith et al, U.S. Pat. No. 2,926,136; Burkland U.S. Pat. No. Re. 25,157; and Goodlaxson U.S. Pat. No. 3,013,645.

The base frame 11 also supports a pump 40 that is diven by the bidirectional motor 33 through the motor mounted pulley 34, the pump drive belt 41, and the pump mounted pulley 42. The pump 40 communicates with the outer tub 25 through a drain conduit 43 and is operable for carrying liquids from the outer tub 25 and pumping them toward an external drain through a drain hose 44 and standpipe 45 when the motor 33 is operated in the direction for effecting centrifugal rotation of the inner tub 30. Since the pump 40 is drivingly connected to the bidirectional motor 33 and is operable in the first and second directions with the motor 33, the pump 40 will tend to pump liquid toward the outer tub 25 through the conduit 43 when the motor 33 is operating in the direction for effecting agitation of the fabrics during the washing portion of the cycle.

Generally the cycle of operations for the automatic fabric washing machine 10 will consist of a plurality of washes which in turn consist of filling the tub 25 with washing liquid, agitation for a predetermined time, spin and pump out for a predetermined time. Variations might include a soak period after the fill, different speeds for agitation and spin depending upon the fabrics, injection or dispensing of various fabric treating substances, and providing hot, cold or mixed washing liquid to the tub 25.

Figure 4:
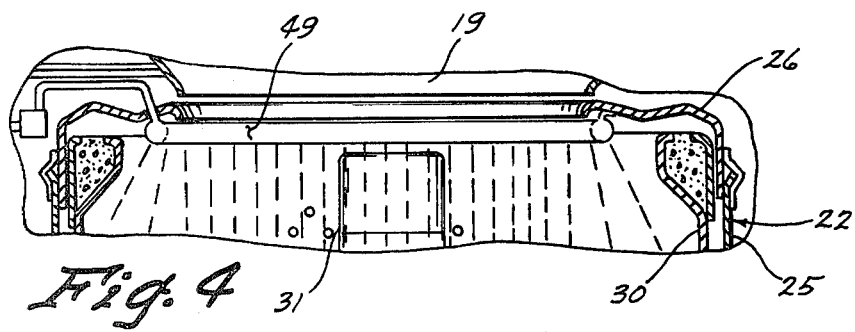
FIG. 4 is a fragmentary sectional view of the upper portion of the tub of FIG. 1 showing an alternate liquid distribution system.
Figure 5:
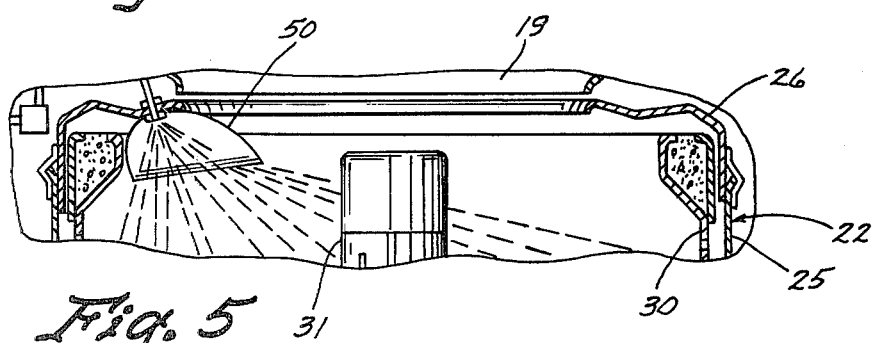
FIG. 5 is similar to FIG. 4 showing yet another liquid distribution system.

As shown in FIGS. 1, 4 and 5 a variety of liquid distribution devices can be used at the inlet. FIG. 1 illustrates a nozzle 46 designed to spread the liquid in a fan-shaped pattern. FIG. 4 shows the liquid being injected into a toroidal distribution member 49 secured to the underside of the tub cover 26 and having a plurality of downwardly directed apertures for directing the liquid onto the surface of the fabrics in a uniform manner around the periphery of the fabric basket 30. FIG. 5 shows a deflector member 50 adjacent the liquid inlet and operable for deflecting and spreading the liquid uniformly onto the surface of the fabrics. While three embodiments of liquid distribution have been shown it should be understood that the invention is not to be strictly limited to these embodiments but could encompass any system operable for at least partially distributing the incoming liquid onto the surface of the fabrics to be treated.

The microcomputer based control system to be described herein is capable of controlling all functions of the automatic washing machine 10 through various sensing and interfacing devices. The subject of this invention, which is best shown in the microcomputer liquid fill subroutine flow chart of FIG. 2 and schematic diagram of FIG. 3, relates to providing a liquid level control which will automatically adjust the liquid level in the tub 25 commensurate with the size and composition of the fabric load. The microcomputer program described herein could be used as the liquid fill subroutine for an overall microcomputer control program for an automatic washer 10. The liquid fill subroutine program for a microcomputer 51 interfaced with appropriate sensors and apparatus as generally shown in FIG. 3 provides a low cost, accurate system for assuring a minimum, yet adequate, liquid level to properly launder a variety of fabric loads.

Figure 3:
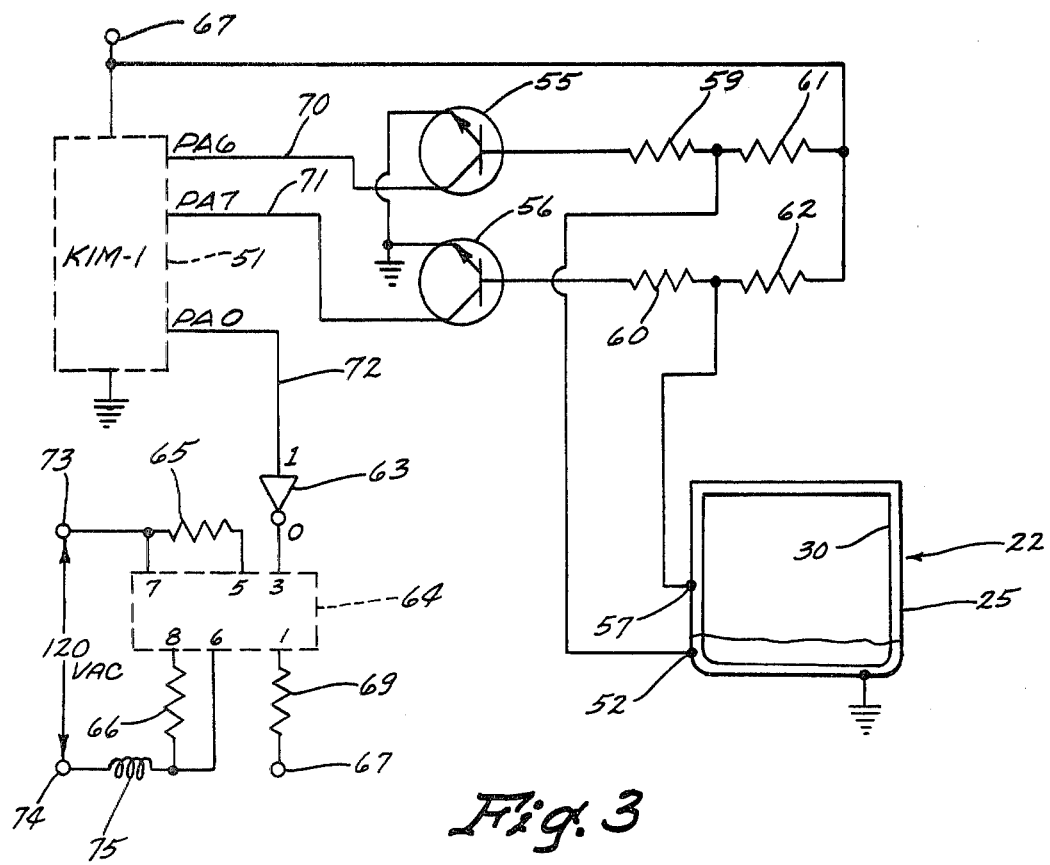
FIG. 3 is an electrical schematic of the liquid level control system of the instant invention.
Figure 6:
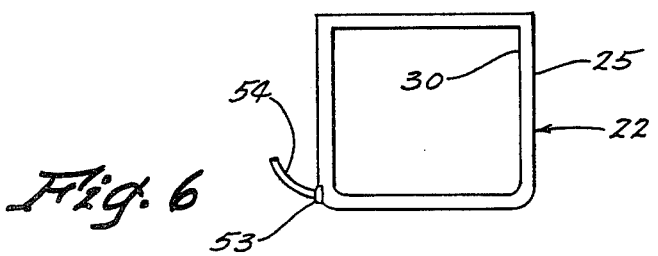
FIG. 6 is a schematic view of the tub of FIG. 3 showing an alternate liquid level detecting system.

The mode of sensing the liquid levels may be a series of electrical contact buttons or sensors 52 and 57 located at the desired levels as shown in FIG. 3 and electrically insulated from the tub 25 for circuit connection with the liquid. Alternatively, a pressure-sensitive device 53 is attached to the outer tub 25 as shown in FIG. 6. The sensing device 53 shown in FIG. 6 utilizes a pressure tap 54 leading to a pressure switch mechanism located in the housing 20. This pressure switch would be operable for detecting at least the 1.25 and 10 gallon levels or any other levels desired. The pressure switch would also be interfaced with the microcomputer 51. Generally, any liquid level sensing device operable for sensing at least two liquid levels and which can be interfaced with the microcomputer 51 system may be used and the scope of the invention is not to be limited by the method of sensing the liquid level in the tub 25.

The microcomputer subroutine program which is to be described herein uses, as a base, a particular embodiment of the invention having a liquid inlet flow rate of four gallons per minute, a two pound fabric load and a ten gallon minimum liquid fill. The time to fill to the 1.25 gallon level will vary with various loads. For instance, it will require a certain time to reach the 1.25 gallon level without fabrics and a different time to reach that level for each particular type and size of fabric load.

In the microcomputer system to be discussed herein, four time periods are measured or determined and utilized for each type and size of fabric load: T1 which is the actual time elapsed to reach the 1.25 gallon liquid level with a fabric load, T2 which is the actual time elapsed to reach the ten gallon liquid level, T3 which is the calculated time to reach the 1.25 gallon liquid level without fabrics as determined from T2 and T4 which is the calculated time to add 0.625 gallons of liquid. It has been arbitrarily determined that for a fabric load between zero and two pounds, a minimum of ten gallons of liquid is required to properly wash the fabrics. The ten gallon minimum level is present in each period of liquid fill since the machine always fills to the ten gallon level and T3 is calculated therefrom. The time differential between filling an empty tub assembly 22 and filling one with a two pound fabric load in the fabric basket 30 to the 1.25 gallon level, with a four gallon per minute flow rate, was empirically determined to be six seconds.

For fabric loads greater than two pounds, more time will be required to reach the same 1.25 gallon level and thus the time differential will be greater than six seconds.

Figure 2:
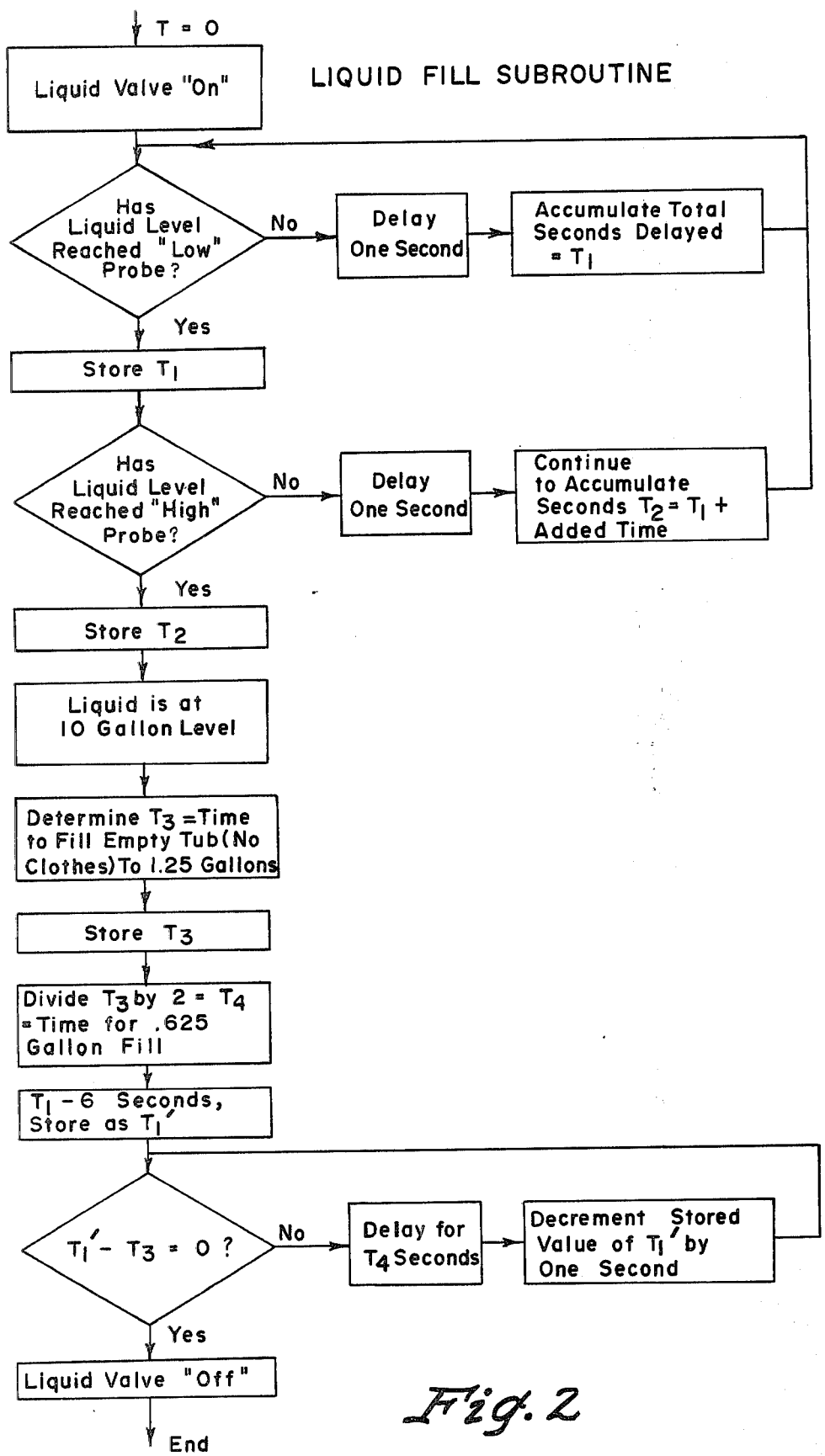
FIG. 2 is a flow chart corresponding to a microcomputer program described herein.

The following is a brief summary of the microcomputer subroutine program for the liquid level control or liquid level subroutine as flow charted in FIG. 2. As the automatic washer cycle of operations is begun, a period of liquid fill will be initiated through the liquid fill subroutine to provide liquid for washing fabrics within the inner tub 30. The microcomputer 51 stores the time elapsed, T1, from the start of fill until liquid is sensed at a first predetermined level such as the 1.25 gallon level. This stored T1 is the actual time required to reach the lower sensor or the 1.25 gallon level and as previously mentioned will vary depending upon the quantity and absorbency of the fabrics in the tub 30. The fill will continue and the total time will be accumulated until a second predetermined level is reached such as ten gallons which has been arbitrarily determined to be the minimum liquid fill for a specific zero to two pound fabric load. The time, T2, to reach the second predetermined level is the time, T1, plus the additional time required to reach the second level. It has been empirically determined that T2 with no fabrics in the tub 30 does not vary significantly from T2 with fabrics in the tub 30. This time, T2, is stored and divided by two, four times. The third division by two will be the computed time in seconds, T3, for 1.25 gallons of fill and will correspond to the time to reach the first predetermined 1.25 gallon liquid level with no fabrics in the tub 30 because of the determination that T2 will not vary appreciably with or without fabrics. The fourth division by two will be the time, T4, in seconds required to inject an additional 0.625 gallons of liquid into the tub 25.

As previously discussed there will be a time difference of six seconds required to fill to the 1.25 gallon level with a fabric load suitable for washing in ten gallons of liquid as compared to the time to fill to that level without the fabric load. This time difference of six seconds is utilized to adjust T1 so that if, for this embodiment, the load of fabrics to be washed is from zero to two pounds no additional liquid will be added and the machine will wash with the minimum ten gallon quantity of liquid. If, however, the fabric load should be greater than two pounds, it will take a longer time period T1 for the liquid to flow through the mass of fabrics and reach the 1.25 gallon level. Consequently, the time difference for a load greater than two pounds will be greater than six seconds and for each additional second over the six second difference for a two pound load the inlet valve will be actuated to add another 0.625 gallons of liquid over the ten gallon minimum.

In the microcomputer program the adjusted T1 is stored as T1' in place of the original T1 and is compared with the computed time, T3, for reaching the first level without fabrics. If the times T1' and T3 are dissimilar, the fill system will be actuated for T4 seconds, as shown in FIG. 2, to add an additional 0.625 gallons of liquid. At this time, T1' will be decremented by one second and again compared to T3. This comparison and additional fill process will continue until T1' minus T3 equals 0.

As previously mentioned, the microcomputer program may be used as the liquid fill subroutine of a total program for a microcomputer controlled automatic washer 10 as in the present embodiment. On the other hand, the program could be the total program for a system which only controls the fill level of a tank or apparatus requiring a controlled fill. The liquid fill subroutine program described herein can be used to provide a minimum washing liquid level for laundering specific fabrics or may be overridden by the operator if the specific selection of a small, medium or large fill of washing liquid is preferred. The manual fill selection would be made by depressing the proper switch button control 21 on the housing 20 to choose the desired fill level. Overflow protection would be provided to prevent washing liquid from exceeding a predetermined upper limit in the tub 25.

The following microcomputer subroutine program is compatible with the liquid fill subroutine information flow charted in FIG. 2 and as described hereinbefore.

| LIQUID FILL SUBROUTINE PROGRAM | | | |
|---|---|---|---|
| Address | Data | | Comments |
| 17FA | 00 | | |
| 17FB | 1C | | Initializes KIM-1 and permits transfer of following program from audio tape to read/write memory. |
| 17FC | 00 | | |
| 17FD | 1C | | |
| 17FE | 00 | | |
| 17FF | 1C | | |
| 00F1 | 00 | | Note: All addresses and data are in hexadecimal notation. ($ denotes hexadecimal) |
| 17F9 | 01 | | |
| 1873 | G0 | | |

| Address | Data | | Comments |
|---|---|---|---|
| 0100 | A2 | 00 | Initialize "X" register |
| 0 02 | A9 | 01 | Load 01 to accumulator |
| 0104 | 8d | 01 17 | Store 01 @ Loc.1701 [Configures PA0 (Pin #14) as an output. PA1 through PA7 are configured as inputs.] |
| 0107 | Ad | 00 17 | Load accumulator with operand @ Location 1700 (Side "A" data) At start of program Pin 8 (PA7) and Pin 7 (PA6) are grounded therefore the data loaded to the accumulator is (00111111)$_2$ or $3F. |
| 010A | 30 | 06 EA | Branch on results negative. (Results become negative when operand @ Location 1700 becomes $BF.) |
| 010d | 20 | 3F 02 | JSR 1 sec. delay |
| 0110 | 10 | F5 | Branch on results positive |
| 0112 | 86 | 0A | Store "X" register @ zero page location $0A |
| 0114 | Ad | 00 17 | Load accumulator with operand @ Location 1700 (Side "A" data) |
| 0117 | 29 | 40 | "AND" operand with $40 |
| 0119 | d0 | 06 | Branch, if results do not equal zero, to Location 0121 |
| 011b | 20 | 3F 02 | JSR 1 sec. delay |
| 011E | 4C | 14 01 | Jump to Location 0114 |
| 0121 | 86 | 0b | Store contents of "X" register @ zero page Location $0b |
| 0123 | 4C | 60 02 | Jump to Location 0260 |
| 0260 | 8A | | XFER "X" register to accumulator = time (secs.) for 10 gal. fill |
| 0261 | 18 | | Clear carry bit |
| 0262 | 6A | | ROR = ÷ 2 = time (secs.) for 5 gal. fill |
| 0263 | 18 | | Clear carry bit |
| 0264 | 6A | | ROR = ÷ 2 = time (secs.) for 2.5 gal. fill |
| 0265 | 18 | | Clear carry bit |
| 0266 | 6A | | ROR = ÷ 2 = time (secs.) for 1.25 gal. fill |
| 0267 | 85 | 0C | Store actual rate of fill (1.25 gal. fill time @ |

-continued

| | | LIQUID FILL SUBROUTINE PROGRAM | |
|---|---|---|---|
| | | | Location $0C) |
| 0269 | 18 | | Clear carry bit |
| 026A | 6A | | ROR = ÷ 2 = time (secs.) for 0.625 gal. fill |
| 026b | 85 | 0d | Store 0.625 gal. fill time @ Location 0d |
| 026d | A5 | 0A | Load operand @ Location 0A to accumulator |
| 026F | 38 | | Set carry flag |
| 0270 | E9 | 06 | Subtract 06 from accumulator |
| 0272 | EA | | No operation |
| 0273 | 85 | 0A | Store accumulator @ Location 0A |
| 0275 | C5 | 0C | Compare accumulator with operand @ Location 0C (A-0C) |
| 0277 | 10 | 06 | Branch, on results positive, to Location 027F |
| 0279 | A9 | 00 | Load 00 to accumulator |
| 027b | 8d | 01  17 | Store 00 @ Location 1700. Configures all pins (PA0-PA7) as inputs. |
| 027E | 00 | | Halt |
| 027F | C6 | 0A | Decrement operand @ Location 0A by one |
| 0281 | 4C | 90  02 | Jump to Location 0290 |
| 0284 | A5 | 0A | Load 0A to accumulator |
| 0286 | 4C | 75  02 | Jump to Location 0275 |
| 0290 | A5 | 0d | Load 0d to accumulator = time (seconds) for 0.625 gal. fill |
| 0292 | 85 | 10 | Store accumulator @ Location 10 |
| 0294 | 20 | 3F  02 | JSR 1 sec. delay |
| 0297 | C6 | 10 | Decrement Location 10 by one |
| 0299 | d0 | F9 | Branch to Location 0294 on results not zero |
| 029b | 4C | 84  02 | Jump to Location 0284 |
| 023F | A0 | 04 | Load "Y" register with 04 |
| 0241 | A9 | FF | Load accumulator with $FF |
| 0243 | 8d | 07  17 | Store @ Location 1707 |
| 0246 | 2C | 05  17 | "Bit" operation - check for Z = 1 when A∧M = 0 |
| 0249 | 10 | Fb | Branch, on results positive, to Location 0246 |
| 024b | 88 | | Decrement "Y" register by one |
| 024C | d0 | F5 | Branch to Location 0241 on result not zero |
| 024E | E8 | | Increment "X" register by one |
| 024F | 60 | | Return from subroutine |

While the liquid fill subroutine program described herein was written for a particular flow rate of four gallons per minute it is anticipated that from the time accumulated to fill to a predetermined level or from sensing the liquid level in the tub 25 after a predetermined period of fill the flow rate can be calculated by the microcomputer 51 and appropriate additional quantities of washing liquid can be injected based upon the calculated flow rate. Also, a transducer type of flow rate monitoring device could be utilized to provide a constant indication of changing flow rate to the microcomputer 51.

In FIG. 3 there is shown schematically the liquid fill circuit utilized in the liquid fill subroutine program and including the following components: A KIM-1 microcomputer module 51 by Mostech Industries Incorporated; two 92PU45 Darlington type transistors, 55 and 56, by National Semiconductor; two 1 megohm resistors, 59 and 60; two 2.2 megohm resistors, 61 and 62; a 7404 type inverter 63; an optically coupled solid state relay 64, number MCS6200 by Monsanto; and resistors 65, 66 and 69 which are selected to provide the proper turn-on current for the MCS6200 solid state relay 64.

Referring again to FIG. 3, when the washing machine 10 is initially started, as by the operator selecting a cycle, the liquid fill subroutine will be initiated and the positive 5 volt potential of line 67 is applied to resistors 61 and 62. When there is no liquid in the tub 25 there will be no path to ground from the junctions between resistors 59, 61 and resistors 60, 62 since the contact buttons or sensors 52 and 57 are electrically insulated from the tub 25. Thus, the positive 5 volt potential of line 67 causes base to emitter current to flow in transistors 55 and 56. At this time, there will be a collector to emitter current flow which will effect approximately a 0.4 volt drop across the collector to emitter junction causing pins PA6 and PA7 through lines 70 and 71 to be at logic 0. A logic 0 will be output on pin PA0 through line 72 which will be inverted to a logic 1 by inverter 63 to turn on a pair of LED's within the MCS6200 relay 64. The LED's are optically coupled to a pair of photo SCR's within the MCS6200 relay 64 to complete a circuit across the lines 73 and 74 for powering the liquid valve solenoid 75 to inject washing liquid into the fabric basket 30.

When the liquid level reaches the lower sensor 52, which is electrically connected to the junction between resistors 59 and 61, a relatively low resistance path to ground is completed through the washing liquid. Thus the current that would be the base current of transistor 55 is partially diverted to ground and the base current of transistor 55 is reduced enough to effectively turn transistor 55 off. When transistor 55 turns off, pin PA6 through line 70, will be a logic 1. The microcomputer 51 now stores the time, T1, required to reach the lower sensor 52 or the 1.25 gallon level for use in later computations.

The upper sensor 57 has not yet been covered by liquid so the microcomputer 51 continues to see a logic 0 at pin PA7 through line 71 and the liquid inlet valve solenoid 75 will continue to be actuated to inject liquid into the tub 25. When liquid covers the upper sensor 57 the current path will change as in the case of the lower sensor 52 to turn off the transistor 56. At this time, the microcomputer 51 will store the time, T2, to fill to the upper sensor 57 or the 10 gallon level.

The time, T1, to fill to the lower sensor 52 with fabrics is determined by the particular fabric load. Each different type and size of fabric load will have its own rate of liquid absorption or wicking as well as its flow through rate determined by the quantity of fabric used. This will vary the time, T1, for the liquid flow through the fabric to reach the lower sensor 52 due to the quantity of washing liquid retained by the fabric load.

It has been empirically determined that the time, T2, required to reach the upper sensor 57 or the 10 gallon level will not be significantly different with or without fabrics. The time, T1, to reach the lower sensor 52 is significantly increased with any fabric load but the total time, T2, to reach the upper sensor 57 will be relatively constant with or without fabrics. On this basis, it is assumed that the time, T2, to fill to the 10 gallon level 57 will be essentially constant and T2 is divided by two, three times, to compute the time, T3, to reach the 1.25 gallon level 52, as without fabrics. The actual time to reach the 1.25 gallon level, T1, is adjusted with respect to the load size and as previously discussed is stored as T1'. T1' is compared to the computed time, T3, to reach the lower sensor 52. From the difference in time, T1'—T3, the additional quantity of liquid required can be determined. The microcomputer 51 will, if necessary, maintain operation of the liquid valve solenoid 75 by outputting a logic 0 on pin PA0 through line 72 for an amount of time, T4, to add 0.625 gallons of liquid to the ten gallons of liquid in the tub 25. After an increment of fill, T4, T1' is decremented by one second and the times T1' and T3 are again compared and if not equal another increment of liquid fill is called for until finally T1' does equal T3.

While, in the preferred embodiment, the microcomputer 51 based fill system is shown applied to an automatic fabric washing machine 10 it is not necessarily restricted to this one. This system may be used in any application requiring the automatic and accurate filling of a vessel with a quantity of liquid commensurate with the composition of articles located within the vessel.

The instant invention thus provides a unique system for providing washing liquid to an automatic fabric washing machine 10 based upon the time delay to reach a predetermined level incurred by the absorption level of a fabric load and the flow of the liquid therethrough.

In the drawings and specification, there has been set forth a preferred embodiment of the invention and although specific terms are employed these are used in a generic and descriptive sense only and not for purposes of limitation. Changes in form and proportion of parts as well as the substitution of equivalents are contemplated as circumstances may suggest or render expedient without departing from the spirit or scope of the invention as further defined in the following claims.

I claim:

1. An automatic liquid level control system for a laundry apparatus having a tub for containing liquid and a perforate basket within said tub for containing fabrics to be treated, the combination comprising: inlet means for supplying liquid to said tub and operable for spraying liquid into said apparatus for absorption by said fabrics and flow through said fabrics for accumulation in said tub; means for measuring the rate of change of liquid level in said tub in the presence of fabrics as a gauge of the total liquid required to treat the specific fabric load in said basket; and programmable control means including logic circuit means responsive to said measuring means for determining the additional liquid required to provide said total liquid and for controlling said inlet means to provide an additional timed fill to achieve said total liquid.

2. An automatic liquid level control system for a laundry apparatus having a tub for containing liquid and a perforate basket within said tub for containing fabrics to be treated, the combination comprising: inlet means for supplying liquid to said tub and operable for spraying liquid into said apparatus for absorption by said fabrics and flow through said fabrics for accumulation in said tub; means for measuring the rate of absorption by said fabrics as a gauge of the total liquid required to treat the specific fabric load in said basket; and programmable control means including logic circuit means responsive to said absorption measuring means for determining the additional liquid required to provide said total liquid and for controlling said inlet means to provide an additional timed fill to achieve said total liquid.

3. A liquid level control system as described in claim 2 wherein said absorption measuring means includes means for sensing the time to fill said tub to a predetermined first liquid level as a measure of fabric load characteristics in said basket.

4. A liquid level control system as described in claim 2 wherein said absorption measuring means includes means for sensing a predetermined first level of liquid in said tub after a predetermined timed period of fill as a measure of the fabric load characteristics in said basket.

5. An automatic liquid level control system for a laundry apparatus having a tub for containing liquid and a perforate basket in said tub for containing fabrics to be treated, the combination comprising: inlet means for supplying liquid to said tub by spraying liquid onto the fabrics for absorption by said fabrics and flow therethrough for accumulation in said tub; means for measuring the rate of absorption by said fabrics as a gauge of the fabric load characteristics in said basket and of the total liquid required to treat a particular fabric load; and programmable control means including logic circuit means responsive to said absorption measuring means and operable for determining the additional liquid required to provide said total liquid and for controlling said inlet means to inject an additional quantity of liquid into said tub as determined by said control means and commensurate with the sensed fabric load characteristics.

6. A liquid level control system as described in claim 5 wherein said inlet means further includes means for uniformly distributing said liquid onto the surface of said fabrics for absorption and flow therethrough.

7. An automatic liquid level control system for a laundry apparatus having a tub for containing liquid and a perforate basket in said tub for containing fabrics to be treated, the combination comprising: inlet means for supplying liquid to said tub by spraying liquid onto the fabrics for absorption by said fabrics and flow therethrough for accumulation in said tub; means for sensing one of (a) the time to fill said tub to a predetermined intermediate liquid level or (b) the level of liquid in said tub after a predetermined intermediate timed period of fill as a measure of the fabric load characteristics in said basket and of the total liquid required to treat a particular fabric load; and programmable control means including logic circuit means responsive to said sensing means for determining the additional liquid required to provide said total liquid and for controlling said inlet means to inject a said additional quantity of liquid into said tub commensurate with the sensed fabric load characteristics.

8. A liquid level control system as defined in claim 7 wherein said inlet means further includes means for uniformly distributing the liquid onto the surface of said fabrics for absorption and flow therethrough.

9. An automatic liquid level control system for a laundry apparatus having a tub for containing liquid and a perforate basket in said tub for containing fabrics to be treated, the combination comprising: inlet means for supplying liquid to said tub and for distributing said liquid onto said fabrics for absorption by said fabrics and flow therethrough for accumulation in said tub; means for sensing the time to fill said tub to a first predetermined liquid level as a measure of the fabric load characteristics in said basket and of the total liquid required to treat a particular fabric load; means for sensing the time to fill said tub to a second higher predetermined liquid level; and programmable control means including logic circuit means responsive to said sensing means for utilizing the times to fill to said first and second levels for determining the additional liquid required to provide said total liquid and for controlling said inlet means to inject said additional quantity of liquid into said tub commensurate with the sensed fabric load characteristics.

10. A liquid level control system as defined in claim 9 wherein said control means includes circuitry for providing a first current path prior to attaining said first predetermined liquid level and a second current path upon reaching said first liquid level for controlling operation of said inlet means.

11. A method of automatically determining and providing a liquid level in a laundry apparatus having a tub for containing liquid and a perforate basket in said tub for containing fabrics to be treated, comprising the steps: injecting liquid into said tub by spraying the liquid onto the fabrics for absorption by said fabrics and flow therethrough for accumulation in said tub; sensing the time to fill said tub to a first predetermined liquid level as a measure of the fabric load characteristics; sensing the time to fill said tub to a second higher predetermined liquid level and determining therefrom the time to fill said tub to said first predetermined level without fabrics; determining the additional quantity of liquid required commensurate with the sensed fabric load characteristics and based upon a comparison of the actual time to fill to said first predetermined level and the time to fill to that level without fabrics; and injecting said additional quantity of liquid into said tub.

* * * * *